United States Patent
Feldkamp et al.

(10) Patent No.: US 10,646,823 B2
(45) Date of Patent: May 12, 2020

(54) FLUE GAS CLEANING INSTALLATION AND METHOD FOR CLEANING FLUE GAS

(71) Applicant: Hamon Enviroserv GmbH, Bochum (DE)

(72) Inventors: Markus Feldkamp, Bottrop (DE); Markus Dickamp, Bochum (DE); Tianjing Li, Essen (DE); Lars Priebe, Bochum (DE); Christian Moser, Essen (DE)

(73) Assignee: HAMON ENVIROSERV GMBH, Essen (DE)

( * ) Notice: Subject to any disclaimer, the term of this patent is extended or adjusted under 35 U.S.C. 154(b) by 123 days.

(21) Appl. No.: 15/557,239

(22) PCT Filed: Mar. 11, 2015

(86) PCT No.: PCT/EP2015/055090
§ 371 (c)(1),
(2) Date: Sep. 11, 2017

(87) PCT Pub. No.: WO2016/141988
PCT Pub. Date: Sep. 15, 2016

(65) Prior Publication Data
US 2018/0169579 A1    Jun. 21, 2018

(51) Int. Cl.
*B01D 53/02* (2006.01)
*B01D 53/83* (2006.01)
(Continued)

(52) U.S. Cl.
CPC ............. *B01D 53/83* (2013.01); *B01D 53/12* (2013.01); *B01D 53/508* (2013.01);
(Continued)

(58) Field of Classification Search
CPC ........ B01D 2251/404; B01D 2251/602; B01D 2251/604; B01D 2257/2045;
(Continued)

(56) References Cited

U.S. PATENT DOCUMENTS 5,238,666 A  8/1993 Janka
5,246,680 A  9/1993 Esa
(Continued)

FOREIGN PATENT DOCUMENTS

AT  400004 B  9/1995
EP  2260923 A1  12/2010
WO  WO-2006-032288 A1  3/2006

OTHER PUBLICATIONS

International Search Report (in English and German) and Written Opinion (in German) of the International Searching Authority issued in PCT/IB2015/055090, dated Nov. 9, 2015, ISA/EPO, Rijswijk.

*Primary Examiner* — Christopher P Jones
(74) *Attorney, Agent, or Firm* — Harness, Dickey & Pierce, P.L.C.

(57) ABSTRACT

The invention relates to a method for cleaning flue gas, the flue gas to be cleaned and a sorption agent starting material in the form of a solid being injected into a reactor chamber of a fluidized-bed reactor, and a liquid being injected into the reactor chamber separately from the flue gas and the sorption agent starting material, the sorption agent starting material being contacted with the liquid in the fluidized-bed reactor and being converted to a sorption agent in the form of a solid.

2 Claims, 2 Drawing Sheets

(51) Int. Cl.
  *B01D 53/12* (2006.01)
  *B01D 53/68* (2006.01)
  *B01D 53/70* (2006.01)
  *B01D 53/50* (2006.01)

(52) U.S. Cl.
  CPC .......... *B01D 53/685* (2013.01); *B01D 53/70* (2013.01); *B01D 53/50* (2013.01); *B01D 2251/404* (2013.01); *B01D 2251/602* (2013.01); *B01D 2251/604* (2013.01); *B01D 2257/2045* (2013.01); *B01D 2257/2047* (2013.01); *B01D 2257/2064* (2013.01); *B01D 2257/2066* (2013.01); *B01D 2257/602* (2013.01)

(58) Field of Classification Search
  CPC .... B01D 2257/2047; B01D 2257/2064; B01D 2257/2066; B01D 2257/602; B01D 53/12; B01D 53/50; B01D 53/508; B01D 53/685; B01D 53/70; B01D 53/83
  See application file for complete search history.

(56) References Cited

U.S. PATENT DOCUMENTS

2005/0244317 A1  11/2005  Ahman et al.
2008/0159922 A1  7/2008   Sauer et al.

FLUE GAS CLEANING INSTALLATION AND METHOD FOR CLEANING FLUE GAS

CROSS-REFERENCE TO RELATED APPLICATIONS

This application is a National Stage of International Application No. PCT/EP2015/055090, filed on Mar. 11, 2015 and published in German as WO 2016/141988 on Sep. 15, 2016. The entire disclosure of the above application is incorporated herein by reference.

FIELD

The present disclosure relates to a method for cleaning flue gas. The disclosure further relates to a flue gas cleaning installation comprising a fluidized bed reactor having a flue gas inlet unit, a reactor chamber and a nozzle unit, wherein the nozzle unit is arranged between flue gas inlet unit and reactor chamber.

BACKGROUND

This section provides background information related to the present disclosure which is not necessarily prior art.

Flue gas cleaning installations are extensively known in the prior art. An installation of the generic type is described, for instance, in WO 2006/032288 A1. By means of such installations, methods for the separation of harmful gases, for instance HCl, HF, SO2, are implemented. Also dioxins, furans and heavy metals, for instance mercury, can be effectively separated if additional so-called sorbents, such as hearth furnace coke, active carbon or the like are added. For the implementation of the method, fluidized bed reactors, into which the flue gas to be cleaned is fed in via a flue gas inlet unit, are customarily used. This unit is usually a pipeline led up from the boiler and having one or more outlets into the reactor region. In the reactor, a sorbent is stored or introduced. A fluidized bed is then formed in a known manner. Reactors can be operated with circulating fluidized beds or using an entrained-flow process. The flue gas and the sorbent react with each other and the harmful gases are in this way separated from the flue gas. The total gas, i.e. flue gas with the entrained separation residues and sorbent remnants, is relayed via a flue gas outlet unit into a downstream separation unit, usually filter units. In the filter unit, the flue gas is freed of the separation residues and subsequently released. The separation residues are in part fed back to the fluidized bed reactor or, after collection, disposed of or reused.

Thus it is in particular known from the prior art to use as the sorbent, for the desulpherization of flue gas, limestone (calcium carbonate; $CaCO3$) or slaked lime (calcium hydroxide; $Ca(OH)2$). As previously described, these are stored or introduced in the fluidized bed reactor. In recent years, the use of slaked lime has established itself as a more economical alternative to limestone, since the required quantity of slaked lime is about 1.8 times smaller compared to limestone. In addition, in the chemical reaction between flue gas and slaked lime, gypsum is produced, which can advantageously be reused.

Due to the high chemical reactivity of slaked lime, in particular the general handling, stockkeeping and introduction of this sorbent into the fluidized bed reactor has proved, however, comparatively complex. In the case of improper treatment, secondary reactions can hence occur already during storage or the feed to the reactor, which secondary reactions are accompanied by a depassivation of the sorbent and thus reduce the efficiency of the method. In addition, slaked lime has a comparatively strong corrosive effect compared to metals. As regards apparatus, this leads to increased wearing of the feed components of the cleaning installations, which adversely reduces the working life of these components and leads to increased maintenance and repair costs. Furthermore, slaked lime reacts strongly alkaline with moisture. In terms of the handling, comparatively high requirements have therefore to be placed on workplace safety, which is adversely associated with a further rise in process complexity and, in the event of accidents, can lead to a health risk for the persons involved.

SUMMARY

This section provides a general summary of the disclosure, and is not a comprehensive disclosure of its full scope or all of its features.

Starting from the previously known prior art, the object of the present is to provide a method for cleaning flue gas and a flue gas cleaning installation, in which the drawbacks known from the prior art are avoided.

As regards method, for the technical achievement of this object a method, stated in the introduction, for cleaning flue gas is proposed, wherein the flue gas to be cleaned and a sorbent educt existing as a solid are injected into a reactor chamber of a fluidized bed reactor, and wherein a liquid is injected into the reactor chamber separately from the flue gas and the sorbent educt, whereupon the sorbent educt, in the fluidized bed reactor, makes contact with the liquid and is converted into a sorbent existing as a solid.

According to the disclosure, the sorbent which is active in terms of the flue gas cleaning is first formed in the reactor chamber of the fluidized bed reactor. It is therefore possible to store a sorbent educt instead of the actual sorbent and to feed it to the fluidized bed reactor. Advantageously, an educt of the kind which, in comparison with the sorbent, is unproblematic in terms of the general handling, stockkeeping and introduction into the fluidized bed reactor can herein be used. In addition, by virtue of the process management according to the disclosure, the health risks associated with the sorbents are lowered for the persons involved, and the costs associated with the establishment of the necessary work safety measures are reduced. In addition, the use of a preferably non-corrosive sorbent educt prevents the wearing of the sorbent feed components, which leads to a longer working life of these components and lowers the maintenance and repair costs of the installation overall.

According to the disclosure, the liquid is injected into the reactor chamber separately from the flue gas and the sorbent educt. In this way, it is ensured that the conversion reaction first proceeds in the reactor chamber under controlled conditions, and not already during the feed-in of the individual reactants. In the reactor chamber, the contacting of the sorbent educt with the liquid then takes place according to the disclosure, whereupon the sorbent educt is converted into the sorbent. Preferably, the liquid, when injected into the reactor chamber of the fluidized bed reactor, is atomized. Preferably, a liquid-enriched volume region is produced in the reactor chamber, which the sorbent educt must traverse immediately following its injection. An extensive contacting of the liquid with the sorbent educt is hereby ensured, whereby a comparatively high sorbent yield is achieved. The volume region is preferably produced such that it extends over the entire cross section of the reactor interior. According to a preferred feature of the disclosure, the liquid is herein atomized by means of a plurality of nozzles such that, for each nozzle, an atomization volume which widens conically in the direction of injection is formed. Preferably, the liquid is injected via the plurality of nozzles such that the conical atomization volumes overlap. In this way, an optimal wetting of the sorbent educt by the liquid is ensured.

According to a preferred feature of the disclosure, the flue gas to be cleaned is brought into contact in the reactor chamber with the sorbent formed in the reactor chamber. As a result of the immediate formation of the sorbent in the reactor chamber, a maximum activity and effectiveness of the sorbent in terms of the flue gas cleaning is achieved. In contrast to the methods which have been stated in the introduction and have become known from the prior art and in which the sorbent is stored and introduced into the fluidized bed reactor, the therewith associated drawbacks of an unwanted depassivation of the sorbent are avoided. Advantageously, the efficiency of the chemical reaction between constituents of the flue gas and the sorbent, which chemical reaction proceeds during the cleaning of the flue gas, is thus improved. In the method according to the disclosure, less sorbent is consequently required in total than in the methods known from the prior art.

According to a preferred feature of the disclosure, the flue gas is desulpherized by the contact with the sorbent formed in the reactor chamber. Within the meaning of the disclosure, this signifies the bonding of sulphur constituents of the flue gas by the sorbent. Preferredly, a sorbent of the kind which is active in terms of the desulpherization is therefore formed in the reactor chamber. Particularly preferredly, slaked lime (Ca(OH)2) is formed for this purpose. Ca(OH)2 can be prepared from a plurality of possible sorbent educts, in particular from calcium oxide (CaO), calcium nitrate (Ca(NO3)2) or calcium hydride (CaH2). The preparation of Ca(OH)2, within the scope of the disclosure, from CaO and water (slaking) is particularly preferred. In contrast to slaked lime, calcium oxide is comparatively unproblematic in terms of stockkeeping and corrosion characteristics, which ultimately leads to an advantageous reduction in the storage costs of the sorbent educt and in the maintenance and repair costs of the flue gas cleaning installation. Also the preferable injection of water as the liquid within the slaking of calcium oxide is of particular advantage in terms of its good availability and the comparatively good ease of handling from a process engineering viewpoint. In this context, the employment of water is not confined to use in combination with calcium oxide, but leads to slaked lime also in reaction with the other aforementioned sorbent educts.

According to a particularly preferred feature of the disclosure, the water is injected in surplus in relation to the stoichiometric ratio between water and CaO in the formation reaction of slaked lime. It has been shown that the sorbent yield can hereby be raised. It is assumed by the Applicant that this is attributable, in particular, to the dissipation of the reaction heat generated during the hydration of the calcium oxide.

As regards apparatus, for the technical achievement of the object on which the disclosure is based, a flue gas cleaning installation stated in the introduction is proposed, wherein the nozzle unit has nozzles of a first type for injecting the gas to be cleaned and a solid into the reactor chamber, and wherein the nozzle unit has nozzles of a second type for injecting liquid into the reactor chamber, wherein the number of nozzles of the first type substantially corresponds to the number of nozzles of the second type.

According to the disclosure, the flue gas inlet unit serves to connect the flue gas cleaning installation to the externally produced flue gases to be cleaned and to feed these gases to the reactor chamber. According to a preferred embodiment of the disclosure, it is proposed that the flue gas inlet unit of the reactor has at least two flue gas intakes arranged at an angle of between 30° and 90° to each other. In this way, the fluidized bed reactor can be impinged by different flue gas streams. A better flow over and through the absorption zone is obtained. According to the disclosure, the flue gas inlet unit is advantageously followed by a nozzle unit. This generally leads to an improvement of the flow. According to the disclosure, the nozzle unit possesses nozzles of a first type for injecting the flue gas to be cleaned and a solid. The nozzles of the first type are here preferably configured as Venturi nozzles. Preferably, the flue gas inlet unit and/or the individual nozzles of the first type of the nozzle unit have lateral solids inlets, so that, in this way, a more homogeneous distribution of solids in the reactor chamber is realized. At the same time, lower pressure losses in the reactor chamber are also obtained. With particular advantage, it is proposed that, in the nozzle unit, nozzles of the first type with different cross section are used. This relates, on the one hand, to the shape, on the other hand to the diameter. Thus nozzles of the first type with round and/or rectangular cross section and same and/or different diameters can be used, nozzles with different cross sectional shapes such as polygonal, round and the like, or any chosen combinations of the described possibilities can be used.

According to the disclosure, the nozzle unit has nozzles of a second type for injecting liquid into the reactor chamber. It is hereby possible to bring the injected liquid and the injected solid, which latter, as regards the method, is formed at least partially by a sorbent educt, into contact in the reactor chamber and to produce the sorbent no sooner than in the reactor chamber. It is therefore possible to store a sorbent educt instead of the actual sorbent and to feed it to the fluidized bed reactor. Advantageously, an educt of the kind which, in comparison with the sorbent, is unproblematic in terms of the general handling, stockkeeping and introduction into the fluidized bed reactor, can in this case be used. In addition, the apparatus according to the disclosure enables the use of a preferably non-corrosive sorbent educt, whereby the wearing of those components of the apparatus which are involved in the sorbent feed can be reduced, which leads to a longer working life of these components and lowers the overall maintenance and repair costs of the cleaning installation. The nozzles of the second type are preferably formed of atomizing nozzles. Preferably, a liquid-enriched volume region, which the sorbent educt must traverse following its injection, can hereby be produced in the reactor chamber. As a result, an extensive contacting of the liquid with the sorbent educt is ensured, whereby a comparatively high sorbent yield is achieved.

According to the disclosure, the number of nozzles of the first type substantially corresponds to the number of nozzles of the second type. It has been found that such a ratio between the different nozzle types allows optimal intermixing of the liquid with the sorbent educt, which advantageously leads to an increase in the sorbent yield. Within the meaning of the disclosure, "substantially" signifies a ratio between the number of nozzles of the first type and the number of nozzles of the second type of 0.8 to 1.3. The precise ratio is preferably obtained in dependence on the educts which are used. In the particularly preferred case, in which, as the liquid, water and, as the sorbent educt, calcium oxide, is used to form slaked lime, the nozzle unit is preferably configured such that the ratio between the nozzles of the first type and the nozzles of the second type amounts to 1.0 to 2.0, preferably 1.2 to 1.8, most preferredly 1.5.

According to a preferred feature of the disclosure, the nozzles of the first type and the nozzles of the second type are arranged in the nozzle unit such that their outlets located on the reactor chamber side are oriented at an angle of between 0° and 140° to one another. Thus, both parallel orientations of the nozzles and right-angled orientations are conceivable. In addition, embodiments within another range, preferably between 30° and 65° or 100 and 130°, according to reactor geometry, can naturally also be of advantage. In dependence on the respective reactor geometry, the respective particular orientation leads to the formation of a particularly homogeneous, liquid-enriched volume region, whereby the intermixing of the individual educts is improved and the yield is further improved.

DRAWINGS

The drawings described herein are for illustrative purposes only of selected embodiments and not all possible implementations, and are not intended to limit the scope of the present disclosure.

Further advantages and features of the disclosure emerge from the following description on the basis of the figures, wherein.

DETAILED DESCRIPTION

Example embodiments will now be described more fully with reference to the accompanying drawings.

Figure 1:
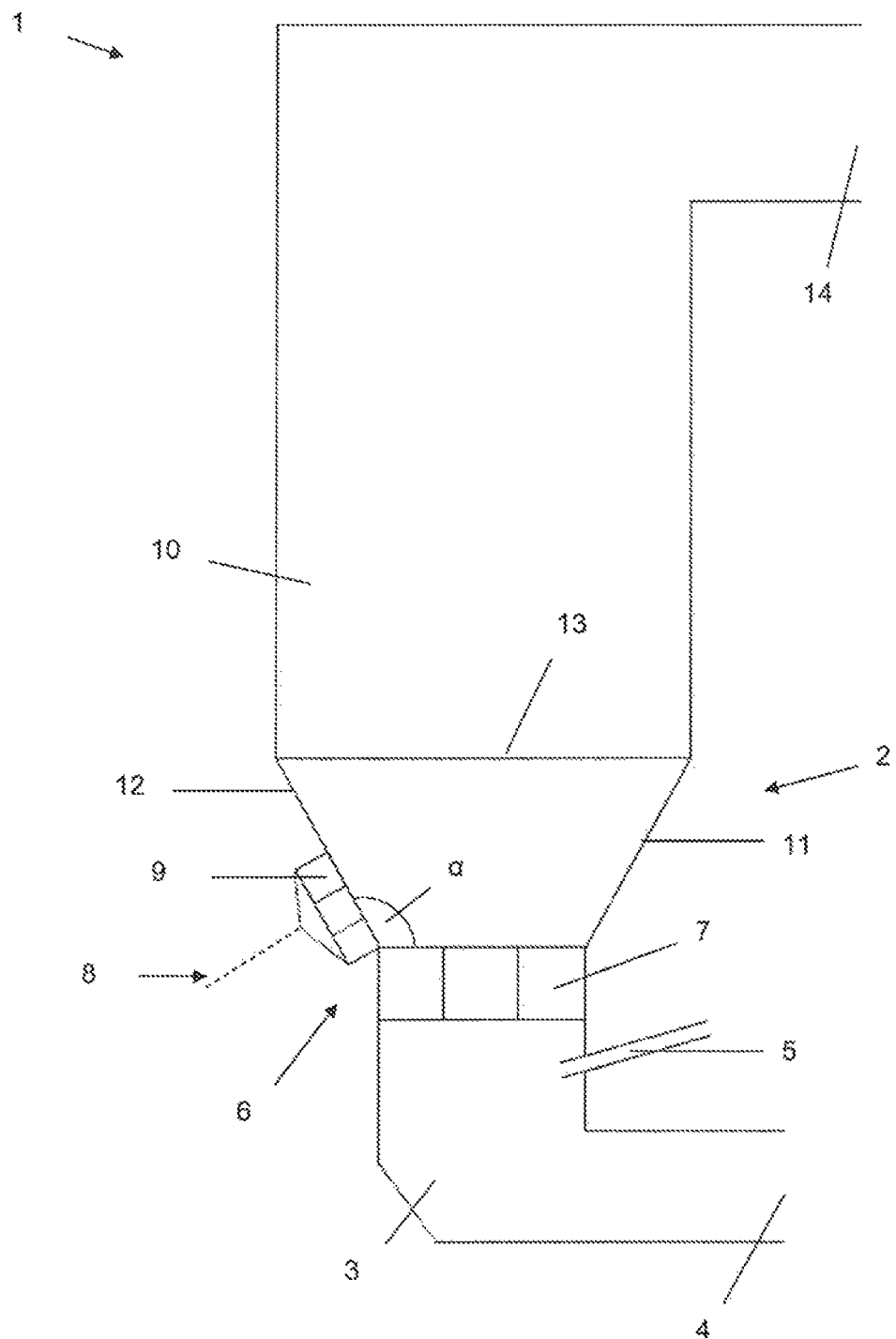
FIG. 1 shows a schematic representation of a flue gas cleaning installation according to the disclosure.

FIG. 1 shows according to the disclosure a flue gas cleaning installation 1 according to the disclosure in schematic representation. The flue gas cleaning installation 1 possesses a fluidized bed reactor 2. The fluidized bed reactor 2 has a flue gas inlet unit 3. The flue gas to be cleaned flows into the fluidized bed reactor 2 through a flue gas inlet 4 of the flue gas inlet unit 3. The fluidized bed reactor 2 further has a solids inlet 5. The solids inlet 5 opens out into the side of the flue gas inlet unit 3. Via the solids inlet 5, the solid which is necessary for the formation of the fluidized bed can be fed, in the present case as a granulate, to the cleaning installation. According to the disclosure, the solid is formed at least partially by a sorbent educt, which likewise exists in granulate form. As a result of the arrangement of the solids inlet on the side of the flue gas inlet unit 3, the solid can be fed in simple manner into the flue gas stream. The flue gas stream carries the solid with it to the nozzle unit 6. The nozzle unit 6 possesses in the present case nozzles of a first type 7. The nozzles 7 are in the present case configured as Venturi nozzles.

The fluidized bed reactor 2 further possesses a liquid feed system 8 (not shown in detail), which, in terms of line connections, is configured completely separate from the flue gas inlet unit 3. The liquid feed system 8 is in the present case connected by line connections to the nozzle unit 6. Within the nozzle unit 6, the liquid is conducted to nozzles of a second type 9. The nozzles 9 are in the present case configured as atomizing nozzles. Between the nozzles 7 and the nozzles 9, no line connection of any kind exists. Contacting of the sorbent educt with the liquid within the nozzle unit 6 is thus precluded.

The nozzles 7 serve to inject the flue gas/sorbent educt mixture into a reactor chamber 10 of the fluidized bed reactor 2. The nozzles 9 serve to inject the liquid into the reactor chamber 10. The nozzles 7, 9 are arranged and oriented relative to one another such that the sorbent educt, immediately after injection into the reactor chamber 10, is brought into contact with the liquid. According to the disclosure, this results in the production of the, in terms of the flue gas cleaning, active sorbent in the reactor chamber 10. In order to optimize the water contacting, those outlets of the nozzles 7 and of the nozzles 9 which are located on the reactor chamber side are arranged and oriented at a specific angle □ to one another. For the formation of an inventive water-enriched volume region for the contacting with the sorbent educt, it is particularly advantageous, given the present geometry of the reactor chamber 10, to arrange the nozzles 7 and 9 such that the angle □ amounts to 120°.

In the present illustrative embodiment, the ratio between the number of nozzles 7 and the number of nozzles 9 amounts to 1. The nozzle unit 6 thus possesses the same number of nozzles 7 and nozzles 9. In the present case, the nozzle unit 6 possesses six nozzles 7 and six nozzles 9. This ratio has proved its worth, in particular in flue gas desulpherization, in which, in the reactor chamber 10, the sorbent educt, calcium oxide, is brought into contact with the liquid, water to form the sorbent, calcium hydroxide (slaked lime).

Figure 2:
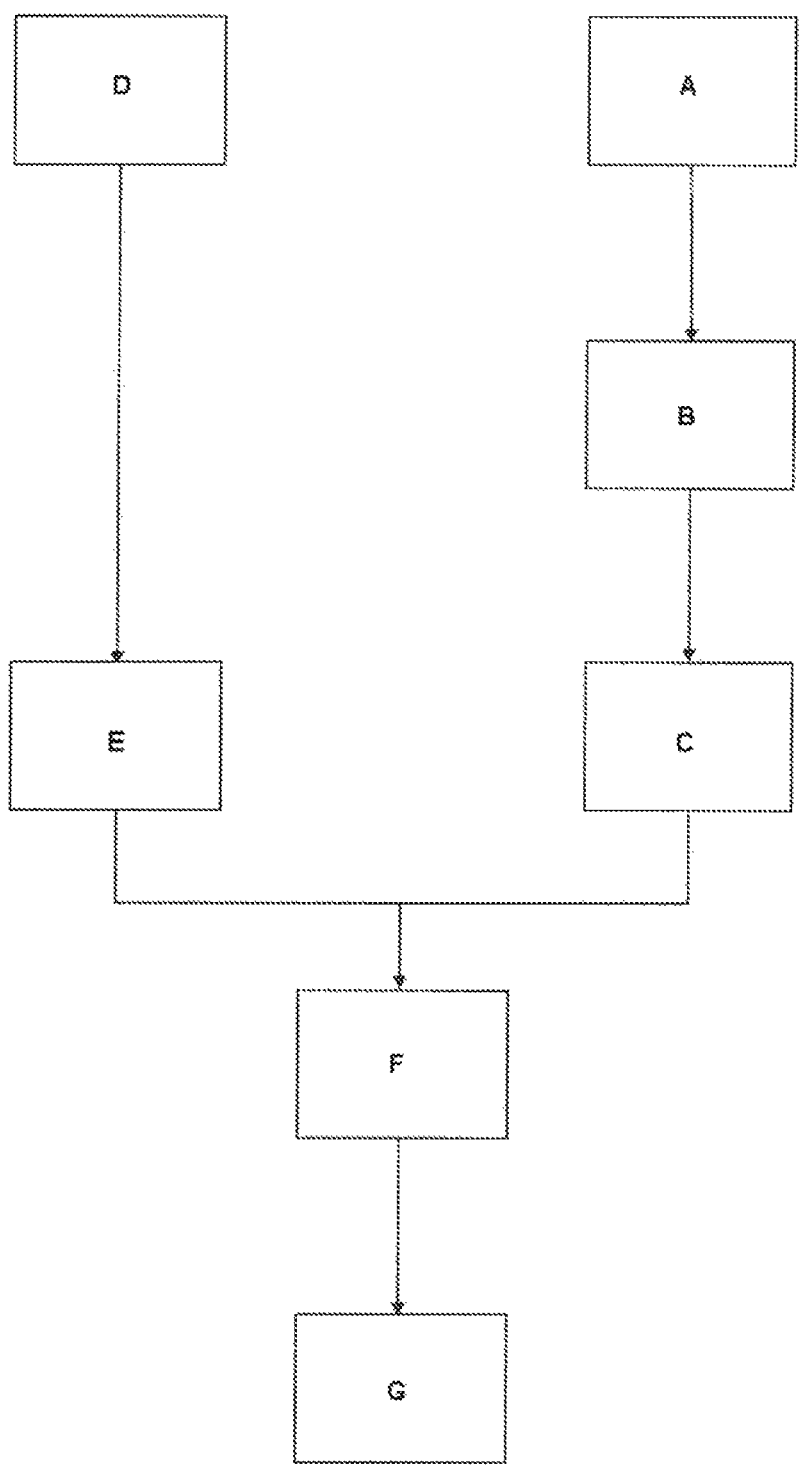
FIG. 2 shows a flow chart of a method for cleaning flue gas according to the disclosure.

FIG. 2 shows a flow chart of a method according to the disclosure for cleaning flue gas, in the present case in particular for the desulpherization of flue gas. For illustration purposes, reference is made below to the reference symbols of FIG. 1. In method step A, the flue gas to be desulpherized is first fed via the flue gas inlet 4 of the flue gas inlet unit 3 to the fluidized bed reactor 2 of the flue gas cleaning installation 1.

In method step B, the sorbent educt, in the present case calcium oxide in granulate form, is introduced into the flue gas stream via the solids inlet 5. The flue gas stream carries the calcium oxide, after the introduction thereof, to the nozzle unit 6.

The flue gas inlet unit 3 opens out, in the direction of flow of the flue gas, into a region of the nozzle unit 6 which is line-connected to the Venturi nozzles 7. In method step C, the mixture of flue gas and calcium oxide granulate is injected via the Venturi nozzles 7 into the reactor chamber 10 of the fluidized bed reactor 2.

In parallel with method steps A-C, the liquid, in the present case water, is fed in method step D via the liquid feed system 8 to the nozzle unit 6, separately from flue gas and calcium oxide. The liquid feed system 8 is in this case connected up to a region of the nozzle unit 6 which is line-connected to the atomizing nozzles 9, but not to the Venturi nozzles 7, of the nozzle unit 6. After this (E), the water is injected via the atomizing nozzles 9 into the reactor chamber 10. Within the reactor chamber 10 is hereupon formed a water-enriched volume region, which is fully traversed by the injected calcium oxide. In order to ensure that contacting takes place, the volume region fills the complete lower portion of the reactor chamber 10. In particular, the volume region is bounded by side walls 11, 12, and also by the injection height 13 (see FIG. 1).

In method step F, the calcium oxide and the water in the reactor chamber 10 are made to react by being brought into contact. The calcium oxide is hereupon hydrated into calcium hydroxide. Due to its immediate production in the reactor chamber 10, the calcium hydroxide which is in this way formed possesses a comparatively high activity compared to the sulphur constituents of the flue gas.

For the desulpherization of the flue gas, the calcium hydroxide in the reactor chamber is brought into contact with the flue gas, in method step G, by means of the formation of a fluidized bed. This flue gas is hereupon desulpherized. After the reaction with the flue gas, the sorbent is discharged from the reactor chamber through the reactor outlet 14 and fed to a filter unit (not shown). The sorbent can hereupon be recycled and re-fed to the fluidized bed process.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A method for cleaning flue gas using a flue gas cleaning installation comprising a fluidized bed reactor having a flue gas inlet unit, a reactor chamber and a nozzle unit, wherein the nozzle unit is arranged between the flue gas inlet unit and the reactor chamber, wherein the nozzle unit has nozzles of a first type for injecting the gas to be cleaned and a solid into the reactor chamber, and wherein the nozzle unit has nozzles of a second type for separately injecting liquid into the reactor chamber, wherein the number of nozzles of the first type corresponds to the number of nozzles of the second type, wherein the nozzles of the first type and the nozzles of the second type are arranged relative to one another such that their outlets located on the reactor chamber side stand at an angle of between 100° and 130° to one another, wherein the nozzles of the second type are configured as atomizing nozzles, wherein the nozzles of the first type are configured as Venturi nozzles, wherein the flue gas to be cleaned and a sorbent educt existing as a solid are injected into the reactor chamber of the fluidized bed reactor, and wherein a liquid is injected into the reactor chamber separately from the flue gas and the sorbent educt, whereupon the sorbent educt, in the fluidized bed reactor, makes contact with the liquid and is converted into a sorbent existing as a solid, wherein, as the sorbent educt, CaO is injected through the nozzles of the first type, wherein, as the liquid, water is injected through the nozzles of the second type, wherein the sorbent educt is converted into the sorbent $Ca(OH)_2$, wherein the liquid, when injected into the reactor chamber of the fluidized bed reactor, is atomized.

2. The method as claimed in claim 1, wherein the flue gas to be cleaned is brought into contact in the reactor chamber with the sorbent formed in the reactor chamber, whereupon the flue gas is desulpherized.

* * * * *